Sept. 17, 1935.   M. J. SCHLITTERS   2,014,510
MULTIPLE TOOL CARRIER ATTACHMENT
Filed Oct. 12, 1933   2 Sheets-Sheet 1

INVENTOR.
Michael J. Schlitters
BY
ATTORNEYS

Patented Sept. 17, 1935

2,014,510

UNITED STATES PATENT OFFICE 2,014,510

MULTIPLE TOOL CARRIER ATTACHMENT

Michael J. Schlitters, Detroit, Mich.

Application October 12, 1933, Serial No. 693,275

10 Claims. (Cl. 29—57)

This invention relates to machine tools, more particularly of the multiple spindle type, wherein provision is made for performing operations upon a number of pieces of work simultaneously in one machine, the invention also adapting itself to the transforming of a rotary multiple spindle machine, arranged for the performing of successive operation on a plurality of pieces of work, into a fixed multiple spindle machine capable of performing simultaneous operations.

In multiple spindle machines it has already been known to provide separate tools for work held in the different spindles, these tools being disposed exterior to the group of spindles and, in combination therewith, further tools have sometimes been used disposed more or less axially in line with the spindles to perform cutting operations simultaneously with the first-mentioned tools.

Applicant's invention proposes to make use of space between spindles of a multiple head, or within a group of such spindles, to accommodate cutting tools; and also to provide tool-feeding mechanism within such space in a manner which is not only economical of available space but also permits of the performance of simultaneous operations not readily possible with tool arrangements heretofore used.

A further object is to provide a form of tool advancing mechanism which lends itself to the effective operation of tools in the proposed situations; and a further object is to provide for the movable coupling together of a plurality of tools in a compact but efficient manner which adapts itself to the operating of a plurality of cutting tools in more or less restricted places between a plurality of spindles or within the space bounded by a plurality of spindles.

Still further objects and advantages, subsidiary or incidental to the aforesaid objects, or resulting from the construction or operation of the invention as it may be carried into effect, will become apparent as the said invention is hereinafter further disclosed.

In carrying the invention into effect, I may provide between a pair of spindles of a machine tool, a pair of parallel spaced tools, each directed towards and movable in the direction of the center of a respective spindle, said spindle being carried by a correspondingly slidable tool holder in a suitable guide supported between the spindles, a common pinion coupled by pins to said tool holders for effecting movement thereof, and a rack bar engaging said pinion and extending laterally to suitable feed mechanism. All of which is more particularly described and ascertained hereinafter, by way of example, having reference to the accompanying drawings, wherein:

Similar characters of reference indicate similar parts in the several figures of the drawings.

Figure 1:
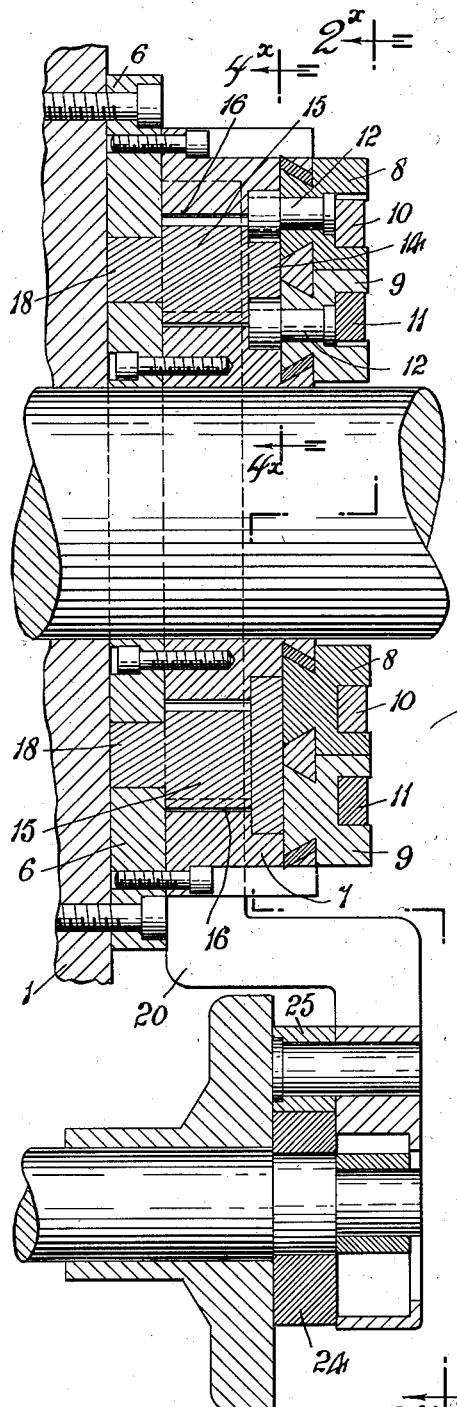
Figure 1 is a vertical section of the spindle head of a multiple spindle machine tool, taken on the line 1ˣ—1ˣ of Figure 2.
Figure 4:
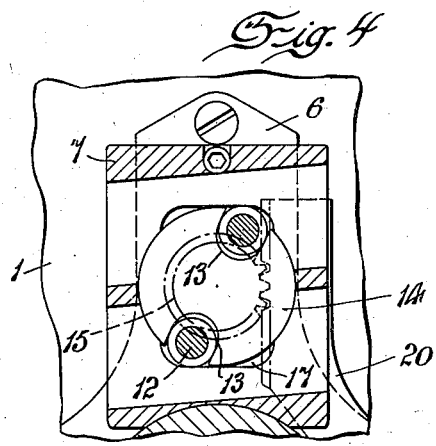
Figure 4 is a detail section of the same, taken on the line 4ˣ—4ˣ of Figure 1.

1 indicates the head of a multiple spindle machine tool, which head may be of a permanently fixed type or which may be, for the purposes of embodiment of the present invention, a rotary head which has been suitably locked against rotation in any suitable manner. 2, 3, 4 and 5 indicate spindles provided with the usual collets for holding work, such as of bar stock, suitable provision (not shown) being made for simultaneous rotation of the spindles where such simultaneous rotation is desired. In the illustrated example, it is assumed that these spindles are rotatable in an anti-clockwise direction.

Mounted on the said head, and extending between the spindles 2 and 3 and the spindles 4 and 5, is a face-plate or spider 6 to the upper and lower arms of which are bolted tool slide carriers 7, each of which carries tool slides 8 and 9. Tools 10 and 11 are secured in a longitudinally adjustable manner in the said slides, the particular method of adjustment and means of securing being matters of choice and not essential to the invention.

The tool slides carry roller-supporting pins 12 which extend rearwardly thereof into radial slots 13 formed in the enlarged circular head 14 of a pinion 15. The pinion is accommodated in a bore 16 formed in the member 7, and the head 14 in a recess or counterbore 17 in the forward part of the said member 7. This recess is of suitable shape to permit travel of the said pins 12 in the direction of tool movement to a required extent. The rearwardly extending spindle 18 of the pinion is rotatably accommodated in the plate 6, as shown.

One side of each of the said members 7 is cut away, as at 19, to disclose some of the pinion teeth, and in this cutaway portion a rack bar 20 is vertically slidable, teeth 21 on the rack bar engaging the pinions 15 to effect rotation of the said pinions upon movement of the rack bar upwardly or downwardly. The rack bar is keyed at 22 in a recess 23 formed in each of the carriers 7 whereby adequate support of the rack bar in its movement is obtained.

Any suitable feed mechanism for the rack bar may be provided and, in the example, a cam 24 is shown as being followed by a roller 25 mounted on the lower part of the said rack bar, the said cam in this example being shown as having a quick rise 26 followed by a slow rise 27, then a dwell or flat 28 followed by a further slow rise 29 terminating in a return ramp to the low point of the cam. This cam is designed, as will be recognized, to operate the pinions through the medium of the rack bar 20 in a manner first rapidly moving the tools 11 up to the work, then feeding them partially into the work at a desirable speed, followed by a pause in the forward feed of the tools when the flat 28 of the cam reaches the roller 25, the completion of the forward movement of the tools being effected subsequently as the roller passes over the further rise 29 of the cam. The tools are then retracted as the roller 25 descends the ramp 30 of the cam, as will be well understood.

Any suitable form of cam or rack-operating device may be used, according to the nature and speed of tool feed required, the present cam serving as an illustration of a method of machining which the present invention makes possible in a multiple spindle machine tool. In a machine tool so equipped, cutting tools 31 may approach the work, exterior to the group of spindles, while the tools 10 and 11 approach the same work from within the space bounded by the spindles, so that, with the cam suggested, the inside tools 10 and 11 may assist in breaking down the metal for the tools 31, which may be forming tools, pausing while the forming tools complete their forming operation, and advancing in a finishing cut when the forming tools have completed their work. This finishing cut may, of course, be the cut-off of the work and may be performed at high speed. Obviously, there is no interference of the inner and outer tools one with the other or a necessity for rotating the head 1 to change position of the work; furthermore, it is not necessary that all tools operate at one and the same time.

To provide steady tool motion and prevent the tools 10 and 11 running up to the work in an undesirable manner, as often experienced in machine tools and well known to machinists, I may provide a steadying device or a brake in the form of a friction plate 32 held against the rack bar by a set screw 33.

The tools 10 and 11 are shown as being set, in this case, at an acute angle to a plane passing through the center of the pinion and through the centers of the spindles, which provides for such separation of the parallelly disposed tools 10 and 11 as is desirable to accommodate the positioning of the pins 12 relative to the center of the pinion 15. Thus the said tools 10 and 11 lie in parallel spaced relation on the opposite sides of the center line of the said pinion.

Figure 5:
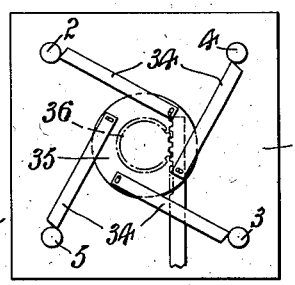
Figure 5 is a schematic illustration of a modified arrangement of the tools.
Figure 3:
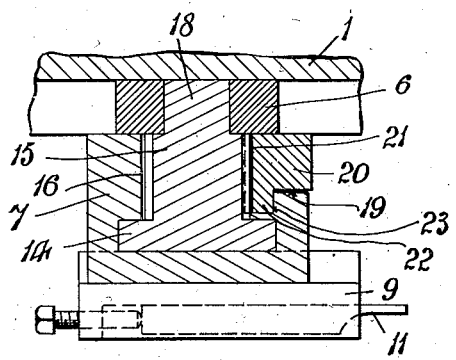
Figure 3 is a detail section through the tool holder mechanism, taken on the line 3ˣ—3ˣ of Figure 2.
Figure 2:
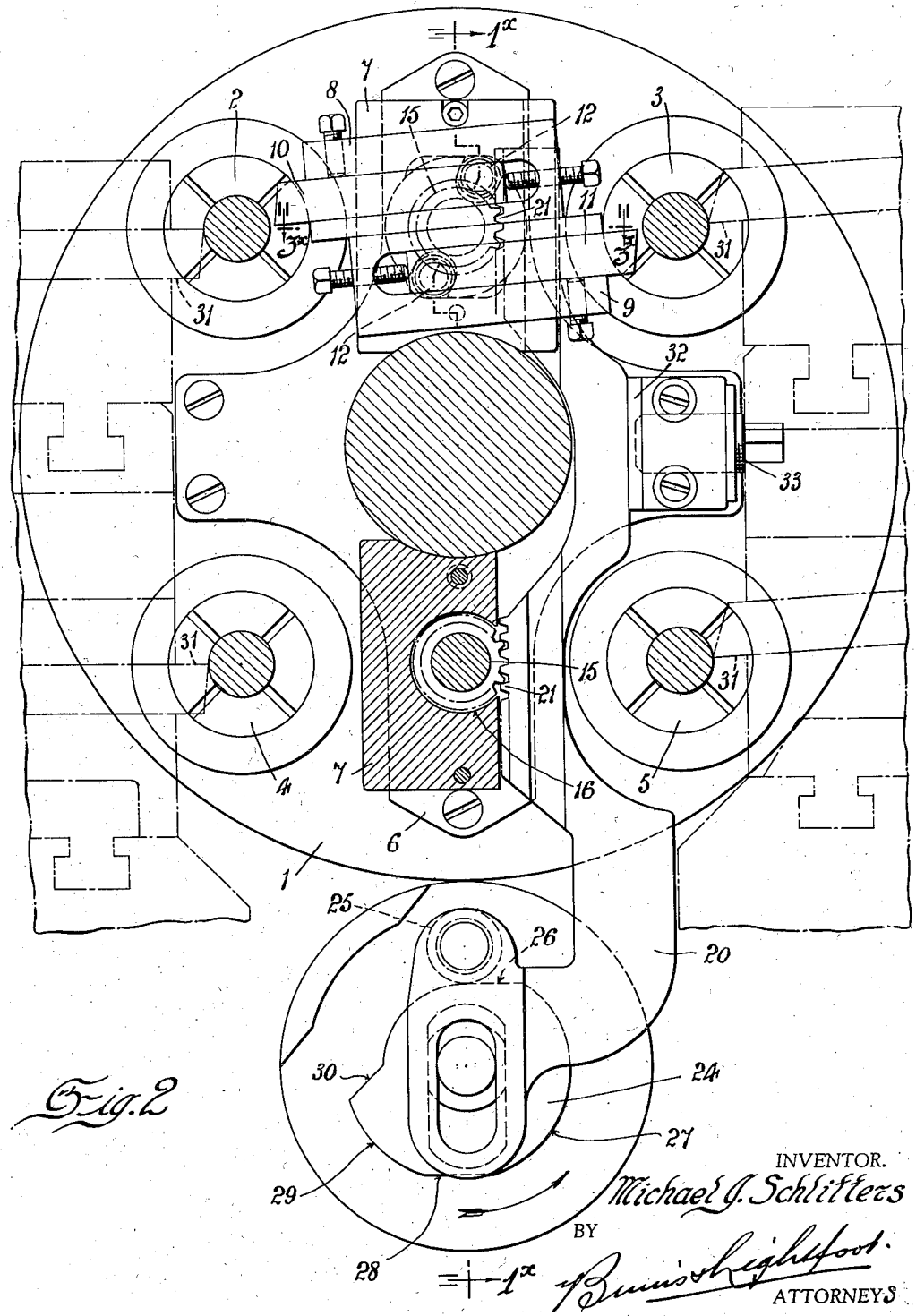
Figure 2 is a front elevation of the head with the mechanism shown partly in section taken on the line 2ˣ—2ˣ of Figure 1.

While the example described shows the tools as being arranged in pairs between the spindles, it will be obvious that a single tool may be used, if only one is required, and it is also possible to arrange the tools for common operation in greater number, such as is shown in the schematic illustration, Figure 5, wherein four tools 34 are shown as being coupled to the common disk 35 of a pinion 36.

The idea of mounting a tool holder on the head or face plate of a machine and providing for the operative coupling of said tool holder to means exterior to the face plate for the feeding of the tool or tools to work carried where the spindle or spindles mounted in the said head or face plate, admits of the utilizing in an efficient and economical manner of space so available without necessarily interfering with the position or operations of any of the tools usually provided in the type of machine to which it is applied.

In the multiple spindle machine, cut-off and other operations may be performed simultaneously on all spindles while they are maintained in fixed positions, and the invention lends itself to adaptation to existing machines and even the transforming of a rotary head machine into a fixed head high-production machine.

This invention may be developed within the scope of the following claims without departing from the essential features of the said invention, and it is desired that the specification and drawings be read as being merely illustrative, and not in a limiting sense, except as necessitated by the prior art.

What I claim is:

1. In a machine tool, in combination, a non-rotatable spindle-carrying head, a plurality of work spindles mounted in said head, tool carriers mounted on said head and parallel thereto, carrier advancing and retracting mechanism also mounted on said head for feeding said carriers toward and from said spindles, and carrier-feeding means remote from said head operatively coupled to said mechanism, said means being movable in a plane perpendicular to the plane of the work spindles.

2. In a machine tool, in combination, a non-rotatable spindle-carrying head, a plurality of work spindles mounted in said head, tool carriers mounted on said head and parallel thereto within the space bounded by said spindles, carrier advancing and retracting mechanism also mounted on said head within said space for feeding said carriers toward and from said spindles, and carrier-feeding means remote from said head operatively coupled to said mechanism, said means being movable in a plane perpendicular to the plane of the work spindles.

3. In a machine tool, in combination, a non-rotatable spindle-carrying head, a plurality of work spindles mounted in said head, tool carriers mounted on said head and parallel thereto, carrier advancing and retracting mechanism common to said plurality of carriers also mounted on said head for feeding said carriers toward and from said spindles, and carrier-feeding means remote from said head operatively coupled to said mechanism, said means being movable in a plane perpendicular to the plane of the work spindles.

4. In a machine tool, in combination, a non-rotatable spindle-carrying head, a plurality of work spindles mounted in said head, tool carriers mounted on said head and parallel thereto within the space bounded by said spindles, carrier advancing and retracting mechanism common to said plurality of carriers also mounted on said head within said space for feeding said carriers toward and from said spindles, and carrier-feeding means remote from said head operatively coupled to said mechanism, said means being movable in a plane perpendicular to the plane of the work spindles.

5. In a machine tool, a plurality of pairs of work-holding spindles, a pair of tool carriers situated between each pair of spindles, mechanism common to each pair of carriers feeding the carriers thereof in relatively opposite direction to and from the spindles, coupling means connecting the mechanism of each pair of carriers together for simultaneous operation, and drawing means operating said mechanisms, said drawing means actuating the coupling means in a plane perpendicular to the plane of the work-holding spindles.

6. In a machine tool, a plurality of pairs of work-holding spindles, a pair of tool carriers situated between each pair of spindles, a rotary member common to each pair of carriers for simultaneously moving them in opposite directions, a reciprocating member operatively coupling said rotary members together, and feed means effecting reciprocation of said reciprocating member.

7. In a machine tool, in combination, a non-rotatable spindle-carrying head, a work spindle mounted in said head, a tool slide carrier fixedly mounted on said head and parallel thereto, a tool carrier slidably mounted in said tool slide carrier, carrier advancing and retracting mechanism mounted on said head and carrier feeding means remote from said head operatively coupled to said mechanism, said carrier feeding means being movable in a plane perpendicular to the plane of the work spindle.

8. In a machine tool, in combination, a non-rotatable spindle-carrying head, a plurality of work spindles mounted in said head, a pair of tool slide carriers fixedly mounted on said head and parallel thereto, a pair of tool carriers slidably mounted in each of said tool slide carriers, carrier advancing and retracting mechanisms mounted on said head within the space for feeding said tool carriers towards and from said spindles, and carrier feeding means remote from said head operatively coupled to said mechanisms, said carrier feeding means being movable in a plane perpendicular to the plane of the work spindles.

9. In a machine tool, in combination, a non-rotatable spindle-carrying head, a plurality of work spindles mounted in said head, tool slide carrier-supporting means extending between the spindles and rigidly secured to said head and parallel thereto, tool slide carriers secured to said supporting means, a pair of tool carriers slidably mounted in each of said tool slide carriers, carrier advancing and retracting mechanisms mounted on said head within the space for feeding said carriers towards and from said spindles, and carrier feeding means remote from said head operatively coupled to said mechanisms, said carrier feeding means being movable in a plane perpendicular to the plane of the work spindles.

10. In a machine tool, in combination, a spindle-carrying head, a plurality of work spindles mounted in said head, tool slide carrier-supporting means extending between the spindles and rigidly secured to said head, a tool slide carriers secured to said supporting means, a pair of tool carriers slidably mounted in each of said tool slide carriers, a pinion mounted in each of said tool slide carriers intermediate a pair of said spindles, a reciprocating rack bar adapted to oscillate said pinions, means cooperating with said pinions for advancing and retracting said tool carriers towards and from said spindles, and means for reciprocating said rack bar.

MICHAEL J. SCHLITTERS.